(12) United States Patent
Rositch

(10) Patent No.: US 6,975,096 B2
(45) Date of Patent: Dec. 13, 2005

(54) METHOD AND APPARATUS FOR REGULATING CHARGING OF ELECTROCHEMICAL CELLS

(75) Inventor: Aaron J. Rositch, Edgerton, WI (US)

(73) Assignee: Rovcal, Inc., Madison, WI (US)

( * ) Notice: Subject to any disclaimer, the term of this patent is extended or adjusted under 35 U.S.C. 154(b) by 0 days.

(21) Appl. No.: 10/440,601

(22) Filed: May 19, 2003

(65) Prior Publication Data

US 2004/0232887 A1 Nov. 25, 2004

(51) Int. Cl.[7] ................................................ H02J 7/04
(52) U.S. Cl. ...................................... 320/147; 429/53
(58) Field of Search ................................ 320/101, 107, 320/165, 132, 113, 115, 134, 136, 147; 429/90, 92, 96, 97, 98, 99, 100, 178, 53, 58

(56) References Cited

U.S. PATENT DOCUMENTS 6,143,440 A * 11/2000 Volz et al. ................... 429/92

* cited by examiner

Primary Examiner—Donald Sparks
Assistant Examiner—Lawrence Luk
(74) Attorney, Agent, or Firm—Quarles & Brady LLP

(57) ABSTRACT

A rechargeable electrochemical cell is provided having a pressure-responsive apparatus for determining a charge termination point. In particular, a reversible pressure-responsive switch may be disposed in a rechargeable cell. A sensor determines when the switch has reacted in a predetermined manner, thus indicating that the internal pressure within the cell has reached a predetermined threshold. The sensor is part of sensing circuitry that is linked to a charger having automatic charging modes depending on the status of the sensing circuit.

26 Claims, 2 Drawing Sheets

METHOD AND APPARATUS FOR REGULATING CHARGING OF ELECTROCHEMICAL CELLS

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

The present invention relates generally to nickel rechargeable cells, such as nickel metal hydride (NiMH) cells, and more specifically to a method and apparatus for automatically reversibly terminating or significantly retarding a cell charging process. This invention may also be employed in nickel cadmium (NiCd) cells.

For greater convenience and portability, many modern electrical appliances and consumer products may be operated to draw electric current from batteries of standard size and electrical performance. For convenience and economy, various rechargeable batteries have been developed, such as nickel metal hydride cells and the like.

Metal hydride cell technology provides excellent high-rate performance at reasonable cost when compared to nickel cadmium and lithium ion technology. Moreover, metal hydride cells have about a 50% higher volumetric energy density than NiCd cells and about equal to lithium ion cells. The internal chemistry of metal hydride rechargeable cells has an impact on the ability to charge such cells. Issues affecting the ability to charge nickel rechargeable cells arise as a result of the internal chemistry of such cells. When a nickel rechargeable cell approaches a full charge state, oxygen is generated at the cathode as follows:

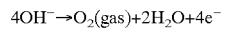

$4OH^- \rightarrow O_2(gas) + 2H_2O + 4e^-$

The oxygen gas diffuses across a gas-permeable separator to the anode where it is recombined into cadmium hydroxide or water as follows:

$\frac{1}{2}O_2(gas) + H_2O + Cd \rightarrow Cd(OH)_2 + Heat @ Cadmium\ anode$

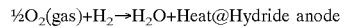

$\frac{1}{2}O_2(gas) + H_2 \rightarrow H_2O + Heat @ Hydride\ anode$

When recharging such cells, it is important to ascertain when the cell has become fully charged. For example, if a cell were to become overcharged for an extended period of time, the pressure buildup within the cell could cause the cell to fail as well as electrolyte to leak, thereby further subjecting the charger to potential damage.

Metal hydride rechargeable cells are typically recharged by applying a constant current rather than constant voltage to the cells. In this scheme, cell voltage increases gradually until the cell approaches full charge whereupon the cell voltage peaks. As the cells reach the overcharge state, the released heat causes the cell temperature to increase dramatically, which in turn causes the cell voltage to decrease. Cell pressure also rises dramatically during overcharge as oxygen gas is generated in quantities larger than the cell can recombine. Unfortunately, it is known that the rate of pressure change is several orders of magnitude faster than the rate of voltage or temperature change. Thus, conventional constant current charge interruption methods cannot support a very fast charge rate without risking internal pressure buildup, rupture, and electrolyte leakage. For this reason, metal hydride cells may be provided with safety vents.

One common way to reduce pressure buildup at the full-charge state is to provide an anode having a excess capacity of greater by 40–50% more than the cathode, a gas-permeable separator, and limited electrolyte to accommodate effective diffusion of gasses. This avoids the production of hydrogen gas at the anode while permitting the oxygen to recombine with the anode material. When a cell reaches full charge, oxygen gas continues to be produced at the cathode, but hydrogen is not produced from the anode. If hydrogen were produced, the cell could rupture from excess pressure. The oxygen recombination reaction therefore controls the cell pressure, as is illustrated in FIG. 1. The oxygen gas then crosses the separator and reacts with the anode material. Downsides of this arrangement include reduced cell capacity and corresponding shorter cell cycle life due to degradation of the anode from overcharge with oxidation and heat.

It is important to stop charging a cell or plurality of cells when a full charge state is reached to avoid possible cell rupture or leakage due to the increasing internal gas pressure. Conventional metal hydride rechargeable cells cannot themselves signal a suitable charge termination point. One must instead rely upon expensive and sophisticated detection circuitry in an associated charger device to determine when charging should end. Charge termination is typically determined by the detection circuitry based on (1) peak cell voltage, (2) peak cell temperature (TCO), (3) duration of charging time, (4) –dV, and (5) dT/dt. Each known method for terminating a constant current charge has disadvantages. For example, time-based termination can be unreliable except at very low charge rates because the cell can become overcharged before termination.

Charge termination based on peak voltage can be unreliable at the end of the charging period because an overvoltage condition can exist before termination. Termination based on a voltage decline (–dV) is necessarily associated with oxygen recombination and the accompanying detrimental temperature rise. In practice, this means that voltage detection must be accurate and fast. Unless the ambient temperature is steady, it can be difficult to accurately measure a change in voltage. Moreover, when the charge rate is slower than 0.3 C, the voltage drop measurement is too small to be detected accurately. A charge rate of 1 C draws a current equal to the rated capacity of the electrochemical cell or battery. Termination based only on peak temperature is also easily affected by ambient temperature changes.

Termination based upon the rate of change in temperature over time (dT/dt) is somewhat more reliable than detecting an absolute temperature change because it is less subject to effects caused by ambient temperature change and because there is less negative effect on cycle life, but it is still based on heat which is detrimental to cell performance and cycle life. This is because temperature increases faster, and, in fact, precedes, the drop in voltage. Accordingly, there is somewhat less risk of rupture and leakage than in the other methods noted above. This makes it the most common charge termination method in use today.

Others in the art have sought pressure-based mechanisms for breaking the connection between the electrode and the cell terminal when pressure exceeds a predetermined level. For example, U.S. Pat. No. 5,026,615 discloses a pressure-sensitive switch in an end cap assembly that comprises a conductive spring member, a nonconductive fulcrum member and a moveable conductive member. The conductive spring member is in electrical connection with a terminal on one end and with the moveable conductive member on the other end. The moveable conductive member is in turn in electrical connection with an electrode. As the internal cell pressure increases, the moveable conductive member exerts force on the spring member, which pivots on the nonconductive fulcrum member and disconnects from the terminal. This patent therefore requires a first and second contact, one of which being movable with respect to the other and rotatable about a fulcrum in order to pivot with respect to the other contact.

This arrangement requires more essential parts than necessary, and further requires that the assembly be constructed with tight tolerances, thereby increasing complexity as well as the cost of production. Furthermore, because contact between the positive terminal cap and the electrodes is severed due to a state of increased pressure, the cell is rendered nonfunctional and is unable to supply power until the pressure drops to a level whereby electrical connection between the electrode and terminal end cap is reestablished. Furthermore, because the conductive members need to be manufactured significantly robust so as to handle the high currents associated with charging and discharging the cell. This adds to the cost of manufacturing the switch.

Other examples of these technologies include U.S. Pat. Nos. 5,747,187, 5,405,715, 5,741,606, 5,609,972, 6,018,286, 6,078,244, and 6,069,551, all of which are incorporated herein by reference as if set forth in their entirety. Some such mechanisms prevent a pressure-induced rupture of the cell but in doing so permanently disable the cell. In other cases, reversible switch devices prevent cell rupture, but do not detect an early charge termination state to avoid heat build up and to ensure superior cell performance and cycle life.

With constant voltage charge, on the other hand, the charging current is high at the beginning of the charge, when the cell can accept higher currents, and then decreases to lower levels as the cell approaches full charge. When constant voltage charging, the above-noted signals for the end of a constant current charge process are not useful because as the cell approaches the full charge state, the cell voltage is constant and the cell temperature is leveling. Like a constant current charge approach, charging time cannot be used for the constant voltage charge when the charge rate is higher than 0.3 C due to run away of pressure that can damage devices. As a result of these shortcomings it has been difficult to identify an effective termination signaling means and constant voltage charging for metal hydroxide cells has therefore been generally considered to be impractical.

With alternating current charge, the charging current may be modulated at a defined frequency or combination of frequencies to produce a net positive current that enables the cell to become charged. An alternating current charge can provide a fast charge with less pressure buildup and lower temperature increase than constant current or constant voltage charge. However, when using an alternating current charge, the above-noted signals for the end of a constant current charge process are not useful because as the cell approaches the full charge state, changes in the cell voltage are difficult to detect above the voltage response to the applied alternating current. As a result it has been difficult to identify an effective termination signaling means and alternating current charging for metal hydroxide cells has also therefore been generally considered to be impractical. It should be appreciated that an alternating current charge is used throughout the present disclosure to mean a varying current that produces a net positive charge, such as a modulated alternating current. For example, an alternating current may be half-wave rectified or full-wave rectified to produce a series of current pulses, or an alternating current may be offset by a desired DC current.

Published Australian patent application number 199926971 A1 discloses a method for fast charging a nickel metal hydride battery in an implant by transcutaneous transmission of electric power from an external power-transmission part to a power-receiving part in the implant. The patent application considers the desirability of an initial rapid high-current charge phase when the internal cell resistance is low, followed by a second lower-current, constant cell voltage charge phase to ensure that the cell is charged only with as much energy as the electrochemical state allows, without excess gassing or heating of the cell. Harmful effects on the battery are precluded while, at the same time, the charging rate remains high. In the method disclosed therein, a first of two charging phases includes the step of allowing a relatively high constant charging current to flow to the power receiving part while the cell voltage rises until it reaches a predetermined limiting charging voltage. In the second charging phase, the charging current is lower than the current level at the end of the first phase while the cell voltage is kept at least approximately at the predetermined constant voltage value. In the Australian patent application, the second charge phase ends when an associated microelectronic controller determines that the rate of change of the charging current over time does not reach a predetermined slope. This cumbersome two-step constant current/constant voltage approach is typical of prior approaches in the art.

In summary, as the metal hydride rechargeable cell reaches its fully charged state, oxygen is evolved from the cathode, thereby increasing the internal cell pressure and driving the exothermic oxygen recombination reaction. At a very high constant current charge rate, usually less than one hour, charge current is still very high at the end of charge. This results in severe heating of the cell and shortened cycle life. The available methods of terminating constant current charge are not very reliable when cell temperature is high. In addition, cell heating is detrimental and it is desirable to terminate the charge before significant cell heating at the stage where damaging pressure begins to rise within the cell.

What is therefore needed is a method and apparatus for more accurately determining the charge termination point for a cell that is fully rechargeable under constant voltage, constant current, and alternating current/voltage charging.

What would be desirable is a cost-effective reversible charge regulating switch that is responsive to a stimulus for determining a charge termination point that is less complex and less destructive than those currently available. It would be further desirable to for the switch to allow the cell to operate even when a charging is discontinued due to high internal cell pressure.

BRIEF SUMMARY OF THE INVENTION

In one aspect the invention provides a rechargeable electrochemical cell having an outer can that defines positive and negative terminals for receiving electrical leads from a charger. Positive and negative electrodes coupled to the positive and negative terminals, respectively. The cell includes a reversible switch having electrical contacts that reacts in a predetermined manner in response to an internal cell pressure level that has increased to a predetermined threshold. The switch is electrically isolated from the electrodes.

In another aspect, the present invention provides a charging assembly including a cell that has a can defining positive and negative terminals connected to positive and negative electrodes, respectively. The cell further includes a reversible switch having electrical contacts that reacts in a predetermined manner to an internal cell pressure level that has increased to a predetermined threshold. A charger is electrically connected to the positive and negative terminals via charging leads to supply a charge thereto. The charger includes a sensing circuit connected to the switch to detect the predetermined reaction of the switch and adjust the charge being sent to the terminals.

The foregoing and other aspects of the invention will appear from the following description. In the description, reference is made to the accompanying drawings which form a part hereof, and in which there is shown by way of illustration, and not limitation, a preferred embodiment of the invention. Such embodiment does not necessarily represent the full scope of the invention, however, and reference must therefore be made to the claims herein for interpreting the scope of the invention.

DETAILED DESCRIPTION OF THE PREFERRED EMBODIMENT

Figure 1:
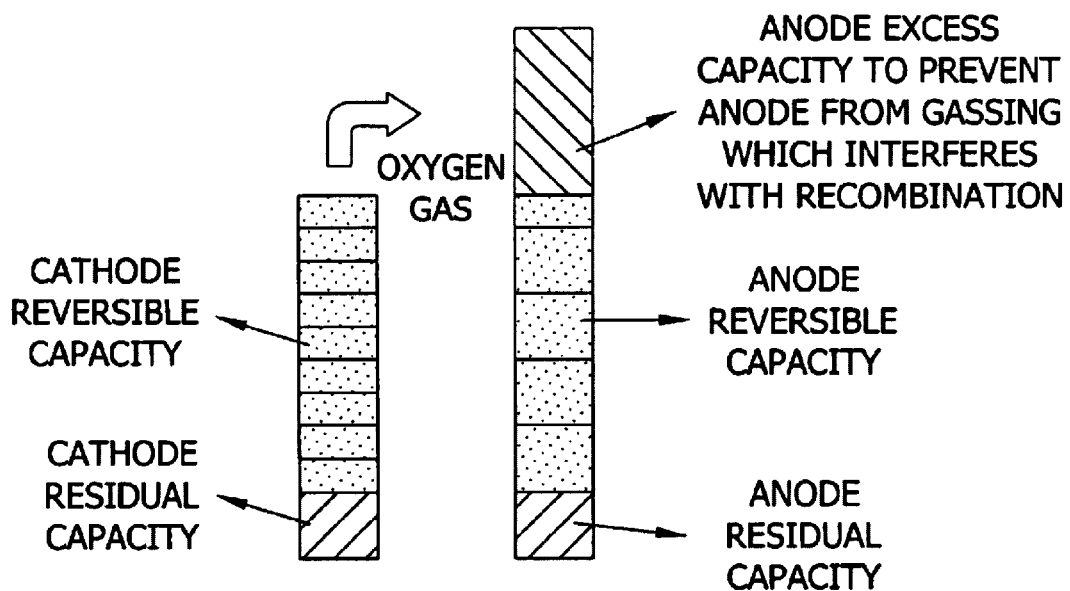
FIG. 1 is a schematic illustration of the oxygen recombination reaction controlling cell pressure.
Figure 2:
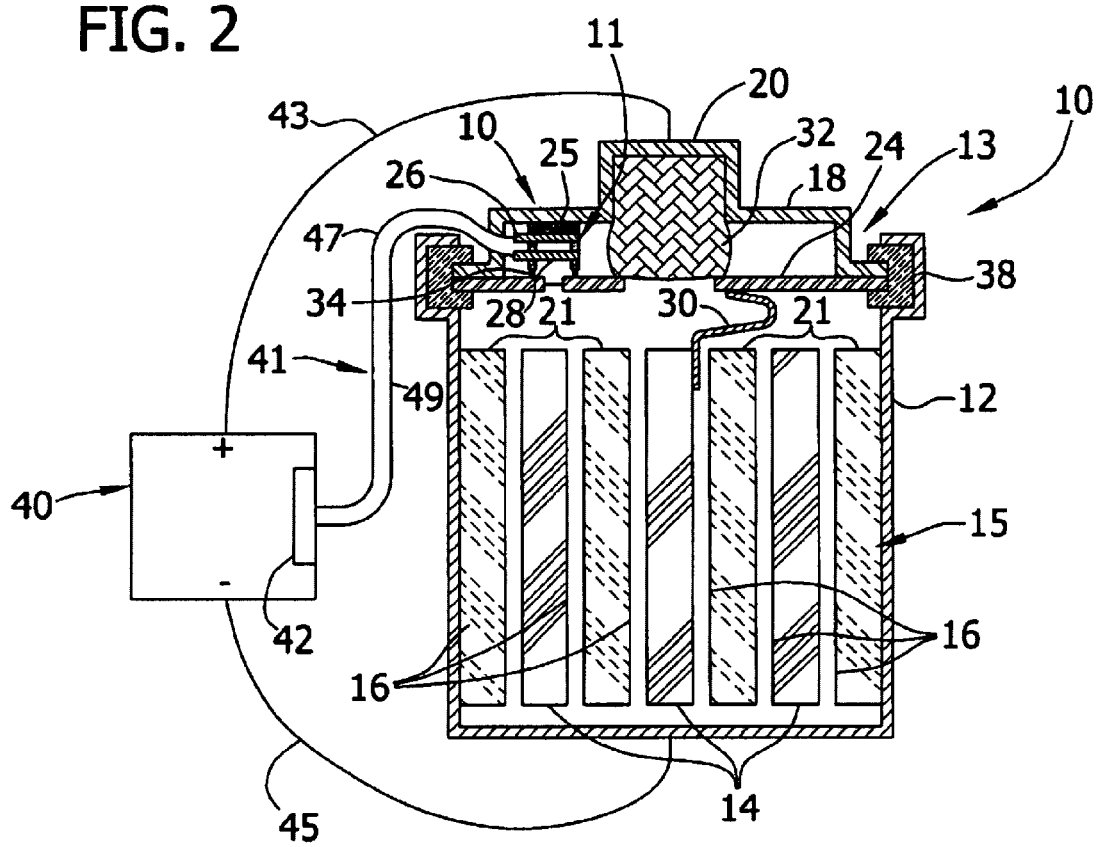
FIG. 2 is a cross-sectional view of an end cap assembly containing a pressure-responsive switch and a pressure-release vent constructed in accordance with a preferred embodiment of the invention, illustrated in a low pressure state.

Referring now to FIG. 2, an axially extending rechargeable cell includes a can 12 having a closed end and an open end 13 disposed opposite the closed end and axially downstream therefrom. While a cylindrical cell is illustrated, it will become easily appreciated by a skilled artisan that the present invention is applicable to rechargeable cells of various sizes and shapes, such as prismatic designs. A cap assembly 10 includes a positive terminal end cap 18 that is secured in the open end of the negative can 12 to provide closure to the cell at the open end 13. In particular, an annular gasket 38 is disposed at the positive end of the can 12 to seal the internal cell contents. Gasket 38 includes a radially inwardly facing groove that retains various elements of the end cap assembly 10 as will be described in more detail below. The open end of the can 12 is adapted in size and shape such that the end cap assembly 10 is sealingly accommodated in the open end by crimping the negative can 12 over the gasket 38 during assembly of the cylindrical rechargeable metal hydride cell. The closed end of the can is conventional.

A positive (e.g., nickel hydroxide) electrode 14 is in electrical connection with the positive terminal cap 18, as will become more apparent from the description below. The cell further contains a negative electrode 21 (e.g., hydride electrode) that is in electrical connection with the can 12, and an alkaline electrolyte (e.g., potassium hydroxide) alone or in combination with other alkali metal hydroxides. The electrode windings are disposed in an internal cavity 15 that is defined by can 12, and are separated by a traditional separator 16. The cell thus provides a first active circuit to supply power to a device into which the cell is installed, and to receive a charging current, as will be described in more detail below. It will be further appreciated below that the preferred embodiment includes a second sensing circuit 41 that is separate from the active circuit.

A conductive plate 24 extends radially from the radially inwardly facing groove of gasket 38, and is electrically connected to the positive electrode 14 via a conductive tab 30. The radially outer end of terminal cap 18 is also disposed within the groove of gasket 38, and thus is in electrical contact with conductive plate. As will become appreciated from the description below, current path between the terminal cap 18 and the positive electrode 14 is maintained even during periods of elevated internal cell pressure, thereby enabling the cell to discharge in its electronic device regardless of the internal cell pressure or state of the sensing circuit.

The positive terminal cap 18 has a centrally disposed nipple 20 that is thus also in electrical contact with positive electrode 14 and is sized and shaped to provide a positive terminal to the cell. The terminal cap 18 along with conductive plate 24 defines a void disposed axially downstream from the electrodes that houses a pressure-responsive switch assembly 11. The switch assembly 11 includes first and second radially extending conductive plates that form a normally open set of contacts 26 and 28, respectively. Contacts 26 and 28 are supported by an nonconductive inverted U-Shaped support member 25 whose base is disposed adjacent the inner surface of terminal cap 18. An elastomeric o-ring 34 is disposed at the distal ends of support member 25, and rest against the axially outer edge of plate 24 to sandwich the switch assembly 11 between the end cap 18 and plate 24. The outer edge of first contact 26 is rigidly supported by base of support member 25, thus rendering contact 26 stationary. The second contact 28 is slightly offset from the first contact 26 such that its middle portion is unsupported, thereby allowing second contact 28 to deflect in response to an elevated internal cell pressure. Because contacts 26 and 28 are initially electrically isolated from each other, the initial state of the switch assembly 11 is open when the internal cell pressure is less than a predetermined threshold.

The cell is electrically connected to a cell charger 40 via positive and negative leads 43 and 45, respectively, that connect the positive end of the cell to the positive end of the charger and the negative end of the cell to the negative end of the charger, respectively. Charger 40 is thus operable to supply a charging current to the cell under a constant or alternating voltage or current, as desired. Charger 40 includes a sensor 42 having first and second inputs that are electrically connected to the first and second contacts 26 and 28, respectively, via leads 47 and 49. Sensor 42, along with leads 79 and 49 and switch 11 form a sensing circuit 41 that determines when the internal cell pressure has exceeded a maximum permissible threshold for charging. In particular, sensor 42 determines whether the circuit 41 is open (indicating a low pressure situation) or closed (indicating a high pressure situation), as will now be described in more detail below. It should be easily appreciated that the switch 11 could alternatively be normally closed during low pressure situations, in which case the circuit 41 would open in response to elevated internal cell pressure.

Figure 3:
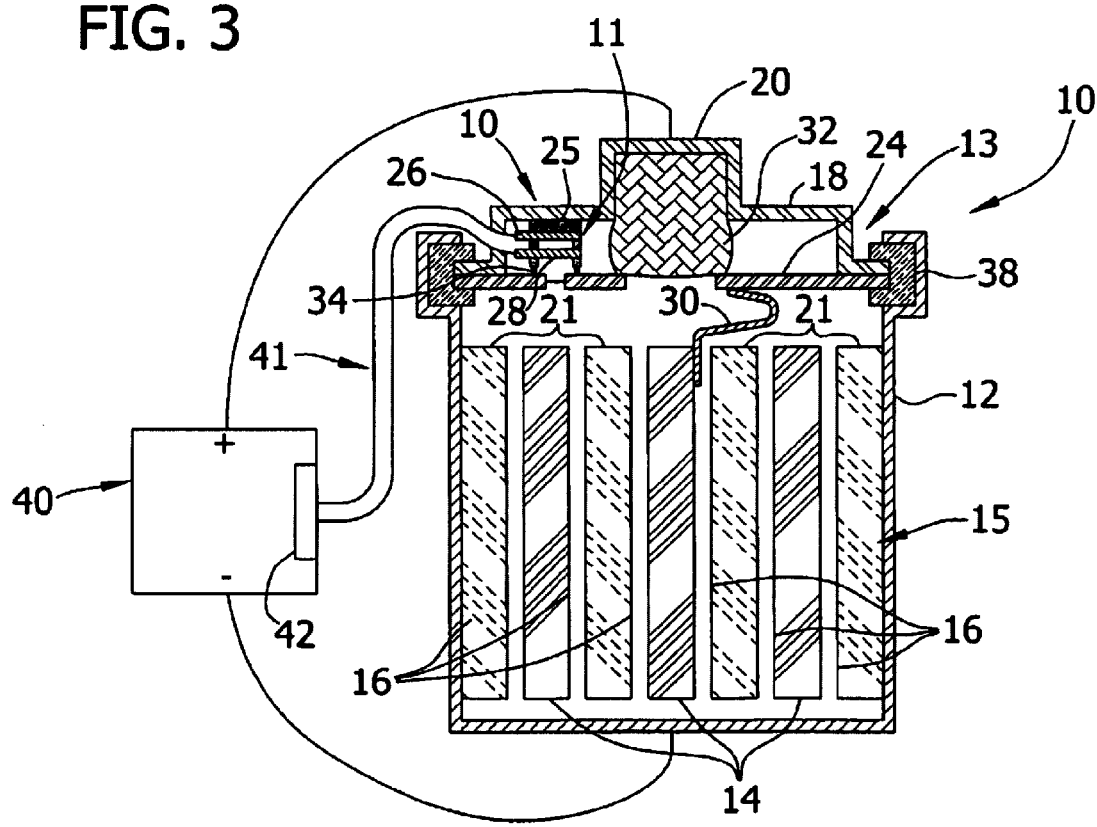
FIG. 3 is a cross-sectional view of the end cap assembly illustrated in FIG. 2A in a high pressure state.

In particular, referring now to FIG. 3, contacts 26 28 are sufficiently flexible and conductive to enable the second contact 28 to deflect under pressure such that an electrical signal can be passed between the two contacts when they are in the "on" (connected) position. Preferably the material is a metal having a thickness small enough to enable the second contact 28 to deflect, though a plastic with a conductive (metal) coating or a metal part attached to the contact side would be acceptable. Advantageously, contacts 26 and 28 are electrically isolated from the electrodes of the cell and thus are not subjected to the high current levels associated with charging and discharging the cell during use. Accordingly, they may be manufactured as thin as desirable so that they perform their desired pressure-responsive function. Such contacts are significantly less expensive to manufacture compared to conventional switch mechanisms that must be manufactured sufficiently robust in order to tolerate higher current levels.

Because first contact 26 is rigidly supported by support member 25, contact 26 does not deflect in response to fluctuations in cell pressure. Contact 28, on the other hand, is not fully supported along its entire length and instead has an unsupported middle portion that bows outwardly (or axially downstream) in response to elevated in internal cell pressures.

Accordingly, as pressure accumulates within the cell during charging, the middle portion of second contact 28 will begin to bow outwardly. As the middle portion of second contact 28 continues to deflect from the first open position, the switch 11 assumes a second closed configuration, whereby second contact 28 is brought into contact with contact 26, thereby closing the circuit 41. The closed sensing circuit 41 is sensed by sensor 42, and the charger ceasing charging of the cell until the switch 11 opens once again, as will be described in more detail below. Switch 11 is thus calibrated such that second contact 28 is brought into contact with first contact 26 when the internal cell pressure has reached a predetermined threshold. It should be appreciated that the maximum pressure threshold within the cell may be selected by varying the ductility or the material composition of contact 28, or by varying the thickness of contact 28. The threshold could be further altered by adjusting the amount of clearance between contacts 26 and 28 during normal operating conditions. The charger may be programmed by the user in one of two modes using a switch (not shown) or the like.

In the first mode, the charger discontinues charging upon the closing of the sensing circuit 41 to allow the internal cell pressure to abate to the point that the second contact 28 is removed from first contact 26. Once the sensor determines that the sensing circuit has opened, the charger could either supply a full charge or a trickle charge to the cell. It should be appreciated that a full charge would likely increase the pressure rapidly so as to quickly close the sensing circuit, while a trickle charge may maintain (or increase) the charge of cell without closing the sensing circuit. In the second mode, the charger waits a predetermined period of time after the sensing circuit opens before applying a full or trickle charge to the cell. The waiting period would allow the pressure within the cell to significantly abate, thereby enabling the second contact to revert to its normal, undeflected, state. As described above, the cell may advantageously be used in an electronic device even though the sensing circuit 41 indicates that the internal cell pressure has exceeded it maximum limit.

It should be appreciated that switch 11 could include a pressure transducer that would automatically activate and deactivate the charger 40 when necessary. Because the installation of such a transducer would increase the cost of the cell, the preferred embodiment utilizes the switch and sensing circuit 41 instead. It should be appreciated that the switch 11 could be disposed anywhere within the cell, but is installed in the end cap assembly 10 due to the ease of installation.

During use, the end user installs the cell in the charger, or connects the positive and negative terminals to a remotely located charger, such as an alternator in a vehicle. The user next connects sensing leads to the charger. The cell is then installed into the battery compartment of the device to be powered. As a result, the cell may be used to provide the necessary power to the device, while accepting a charge from the charger 40 only as necessary. It should thus be appreciated that this system would also be advantageous for use in power tools, cellular telephones, electrical vehicles, alternators, or any other type of electronic device that typically relies upon rechargeable batteries.

It should be further appreciated that a plurality of cells could be installed in a battery pack and connected in series within a charger that is configured to supply a constant voltage or constant current charge to the cell. So long as at least one of the cells includes a pressure responsive switch in accordance with the invention (assuming pressure accumulates similarly within each cell), charging will terminate once the pressure within that cell activates the sensing circuit 41 accordingly. Alternatively, each cell could include the switch such that the charging of all cells would terminate once one of the cells reaches a maximum permissible internal pressure. Alternatively, the cells could be connected in parallel to a charging source, in which case each cell would include a pressure responsive switch in accordance with the present invention.

The cell further includes a pressure release mechanism in the form of a rubber plug 32 that is centrally disposed within end cap assembly 10. Plug 32 extends axially between nipple 20 and plate 24, and is resilient such that pressure will be permitted to vent from the interior of the cell and into the void defined by the end cap assembly 10. An aperture may optionally extend through the end cap 18 (not shown) to provide a means for pressure release from the end cap assembly 10. It should be appreciated that plug 32 is provided merely for redundancy, as the sensing circuit 41 and charger 40 will, under ordinary operating conditions, prevent the internal cell pressure from increasing to a point where venting is needed. It should be further appreciated that the cell could include any alternative venting mechanism known to one having ordinary skill in the art. Generally speaking, for a metal hydride rechargeable cell, typical safety vent systems respond to internal cell pressures of about 600 psig and higher, and more typically in the range of between about 1000 to 1200 psig.

The internal cell pressure at which the pressure-responsive switch is biased from the low pressure position to the high pressure position (the "biasing pressure") can vary according to the size and shape of the battery, the charging rate and other charging conditions such as ambient temperature. For example, when the anode of a battery has a much higher capacity than the cathode of the battery, the cell internal pressure at a low overcharge rate may be stabilized at a relatively low level such as 30–50 psig. Similarly, the higher the charge rate, the higher the cell internal pressure will be when a battery approaches the full charge state or reaches an overcharge state. Thus, when a switch is built for a battery having a much higher capacity at the anode and/or when the battery will be charged at a very low rate, the biasing pressure of the pressure-responsive switch should be low enough to ensure that charge can be stopped when the battery reaches a full charge or overcharge state. On the contrary, when a switch is used in a battery that has similar anode and cathode capacities, or when the battery will be charged at a high rate, the biasing pressure can be set at any level that satisfies battery safety concerns since there is no question that the cell internal pressure can reach the biasing pressure.

Preferably, however, a pressure-responsive switch should have a switch pressure that is close to the internal pressure when the cell reaches the full charge state, to prevent problems such as overheating. One of ordinary skill in the art knows how to determine cell internal pressure at the point of full charge or overcharge. Generally speaking, for a fast nickel metal hydride rechargeable cell, a pressure-responsive switch may have a biasing pressure of between about 50 psig and 500 psig. It is preferable that the switch pressure is between 100 and 400 psig. It is most preferable that the switch pressure is between 200 and 300 psig.

As described above, the cell pressure may close the sensing circuit 41 before the cell has achieved a full charge. The cell may subsequently reach a full charge during the subsequent iterative charging sequences. The charger may thus conclude that charging has terminated either by determining that a zero current is flowing within the cell, when charging time has reached a pre-determined value, or when the sensor 40 determined that switch 11 has closed. As described above, the charger may then either discontinue the charge, or it could continue charging (e.g., a trickle charge), in which case the pressure responsive switch will continue to open and close. This charging mode can be particularly advantageous when charging at a rate faster than 30 minutes, where pressure increases significantly when the cell is approaching a fully charge state, and the on-off of current provided by the pressure switching mechanism will continue to top up the charge to the maximum charge state. If the cell is being charged under constant voltage, constant current or alternating current at a very charge fast rate (charge termination within 30 minutes or less) the cell may be only charged to approximately 70–90%, as it is known that internal cell pressure increases ahead of a full cell charge during charging.

The present invention recognizes that a constant voltage charge is more advantageous than a constant current or alternating when achieving a very fast charge rate (charge termination in 30 minutes or less), because charge current continues to decrease toward the end of charge with constant voltage, and as the result, pressure and temperature are not rising as quick in comparison to charging with a constant current. For example, up to 85–90% of charge can be achieved with constant voltage before the opening of the switch in comparison to 80–85% with alternating current and 65–70% with constant current. In some instances, the fast charging accomplished using the switch presented in accordance with the present invention offsets the disadvantage associated with the partial charging of the cell.

In other instances, it may be desirable to sacrifice time to ensure that the cell has become fully charged. In this instance, if zero-current flows through the cell before the internal pressure has exceeded the maximum threshold, the charger can detect the zero-current, wait until the internal pressure within the cell subsides and then measures the OCV for the cell (a pressure release vent would be particularly advantageous in such cells to minimize the cell depressurization time). Based on the OCV, the charger may determine whether the cell has been fully charged.

For example, it is known that a fully charged metal hydride cell will have an OCV of 1.42 V. Accordingly, if the OCV of the cell is being charged has exceeded a predetermined threshold of 1.42–1.48V, the charger would determine that the cell is fully charged. Otherwise, the charger will conclude that the cell has not yet been fully charged. Accordingly, once pressure within the cell has dissipated such that the electrical connection between contacts is established, the charger will again subject the cell to the alternating or constant current charge until the internal pressure within the cell breaks the electrical connection. This iterative process may continue until the cell reaches a predetermined OCV or a predetermined number of iterations, at which point the charger will provide an appropriate message to the user, for example by illuminating an indicator. Alternatively, the user could select a charge termination (e.g., 80% capacity), at which point the charger would calculate the corresponding OCV and terminate charging when the cell has reached the user-selected charge termination threshold.

This process would be more desirable when using constant current or alternating current charging, as pressure is known to build up significantly before the cell is fully charged. If a constant voltage charge is applied to the cell, it would be expected that the cell would be substantially fully charged after the first iteration, thereby allowing the charger to detect a zero current and indicate that the cell is fully charged. While the zero current flow method described above could also be used in combination with constant current and alternating current charging, the cell may not be fully charged when the first iteration terminates.

One advantage of the reversible switches illustrated and described in accordance with the present invention is that detection of charge termination is not dependent of oxygen recombination. Therefore, there is no longer any need to provide excess anode capacity. Oxygen at the cathode and hydrogen at the anode can be evolved. Both gasses contribute to the pressure. In this case, the anode capacity can be made equal to the cathode capacity, for a net increase in cell capacity. When charging current stops, oxygen recombines with hydrogen to form water: $½O_2+H_2 \rightarrow H_2O$.

Another advantage is that a non gas-permeable separator may be used. This eliminates the needs for having open flow channels within the separator for the gas to be recombined with anode, which had contributed to separator dry out and limited cell cycle life. With the pressure-responsive switch of the invention, additional electrolyte can fill in the channels. Therefore, cycle life and discharge efficiency would be increased.

Another advantage is that charging can proceed at a faster rate than in prior cells. For example, a rechargeable metal hydride battery according to the present invention can be charged in 45 minutes or less, preferably in 30 minutes or less, and most preferably in 20 minutes or less, even 10 to 15 minutes for a NiMH 1.3 Ah AA cell, whereas conventional cells require about 1 hour or more to charge (1.2 C). The charging rate can be accelerated because the invention eliminates the concerns about overpressure and high temperature conditions at the end of charging. In this regard, fast charging may be achieved at rate less than an hour.

Another advantage is that a cell of the present invention can have a higher capacity than a conventional rechargeable metal hydride battery. This is because a cell constructed in accordance with the present invention can have a greater balance of anode material to cathode material. Unlike prior art cells, in which the anode has an excess capacity of greater by 40–50% more than the cathode, a cell of the present invention can have a ratio of anywhere between 0.9:1–1.5:1 by weight of anode material to cathode material in accordance with the preferred embodiment.

Another advantage is that a gas impermeable separator may be implemented, which may be manufactured thinner and denser than the prior art, leaving more room for electrolyte within the cell. Cycle life is thereby increased, as is discharge efficiency.

Another advantage is that even when the internal cell pressure is too high to allow the cell to accept a charge, the cell may still be used in an electrical device, such as a vehicle alternator or cellular phone or the like, whose batteries are typically being constantly charged and discharged either concurrent with charging, or a very short period thereafter.

In particular, oxygen at the cathode and hydrogen at the anode can be evolved during charging. Both gasses contribute to the pressure. In this case, the anode capacity can be made equal to the cathode capacity, for a net increase in cell capacity. When charging current stops, oxygen recombines with hydrogen to form water: $½O_2+H_2 \rightarrow H_2O$. Because, in such an embodiment, the separator may be gas impermeable, the limitation on electrolyte filling for preventing the separator to be totally saturated in prior art cells is eliminated.

Furthermore, whereas the cathode of prior art rechargeable metal hydride cells typically comprise type AB5 alloys, it also possible to employ the higher-capacity AB2 alloys that have traditionally been disfavored in such cells because of overpressure concerns.

While any type of method may be used to charge a cell incorporating a reversible switch in accordance with the present invention, a constant voltage charging method is preferred, since the current is allowed to seek its own decreasing level as charging proceeds without concern that the cell will be subject to overcharging or overpressure. With constant applied voltage charge method, as the cell voltage increases during charge, the current is automatically reduced toward the end of charge. Accordingly, the charging current is high at the beginning of charging when the cell's charge acceptance is high, and tapers to a lower charge current toward end of charge when the cell's charge acceptance is reduced. No expensive and complicated charging control is necessary. The current flowing into the cell is regulated by the cell internal resistance and the cell's own state of charge. When the cell reaches full charge, the increasing internal pressure will activate the pressure switch to interrupt charging. Accordingly, when the switch 11 closes, the cell will be at or near full charge.

Advantageously, strings of cells in parallel can be charged using the same source. Multiple cells in series may also be charged together in accordance with the present invention by receiving the charging voltage that is equal to the open circuit voltage of the cell plus the over-voltage caused by cell internal resistance and the predisposed resistance of the circuit. One skilled in the art will also appreciate that the present invention is equally applicable to cells arranged in parallel and series.

Advantageously, when applying a constant voltage charge, an even faster charge rate than that of constant current charge can be reached due to the ability to increase the charging current at the beginning of the charge when the cell can accept higher currents. It should be appreciated, however, that the present invention is equally applicable to constant current and alternating current charges. As described above, it is known that the pressure inside metal hydride cells rises rapidly when cell charging is essentially complete. As was noted above, the rise in pressure, which follows gassing in the cell, precedes the damaging temperature rise that may shorten cell cycle life. Thus it is desired to terminate charging when the pressure begins to rise and prior to onset of a destructive overpressure condition.

As described above, it is known that the pressure inside metal hydride cells rises rapidly when cell charging is essentially complete. In particular, the rise in pressure, which follows gassing in the cell, precedes the damaging temperature rise that shortens cell cycle life. Thus it is desirable to charge the cells in a manner that reduces the possibility of a destructive overpressure or overheating condition.

A constant current charging method or a constant voltage charging method or a combination method, for example, constant current followed by constant voltage, can be employed in accordance with the present invention. An alternating current charging method can be preferred, since the current is modulated, thus reducing the chance of overcharging, overpressure or overheating.

The nature of the alternating current or voltage waveform is typically, but not exclusively, sinusoidal. Full or half wave rectification may be applied to the alternating current or voltage waveform.

The above description has been that of the preferred embodiment of the present invention, and it will occur to those having ordinary skill in the art that many modifications may be made without departing from the spirit and scope of the invention. In order to apprise the public of the various embodiments that may fall in the scope of the present invention, the following claims are made.

I claim:

1. A rechargeable electrochemical cell comprising:
   (a) a can providing a first cell terminal and having a crimped open end;
   (b) a gasket in the crimped open end, the gasket carrying a second cell terminal, wherein the can and the second cell terminal define an internal space;
   (c) a first electrode coupled to the first cell terminal and a second electrode coupled to the second cell terminal;
   (d) a reversible switch disposed in the internal space and electrically isolated from the electrodes, the switch having contacts that react in a predetermined manner in response to an internal cell pressure level that has increased to a predetermined threshold.

2. The rechargeable electrochemical cell as recited in claim 1, wherein the electrical contacts close when the internal cell pressure reaches the predetermined threshold.

3. The rechargeable electrochemical cell as recited in claim 2, wherein the electrical contacts open when the internal cell pressure falls below the predetermined threshold.

4. The rechargeable electrochemical cell as recited in claim 1, wherein at least one of the switch contacts is flexible in response to pressure.

5. The rechargeable electrochemical cell as recited in claim 1, wherein the open end is closed by an end cap assembly, and wherein the reversible switch is disposed in the end cap assembly.

6. The rechargeable electrochemical cell as recited in claim 5, wherein the end cap assembly is formed proximal the second cell terminal.

7. The rechargeable electrochemical cell as recited in claim 1, wherein the predetermined reaction does not sever an electrical connection between either of the terminals and the corresponding electrodes.

8. The rechargeable electrochemical cell as recited in claim 1, wherein the switch is disposed between the electrodes and the second cell terminal.

9. The rechargeable electrochemical cell as recited in claim 8, further comprising a plate extending radially from the crimped end, wherein the reversible switch is supported by the plate.

10. The rechargeable electrochemical cell as recited in claim 9, wherein the plate extends from the gasket and is conductive and in communication with the second cell terminal and the second electrode.

11. A charging assembly comprising:
(a) a cell having a can providing a first cell terminal and having a crimped open end, a gasket in the crimped open end, the gasket carrying a second cell terminal, wherein the can and the second cell terminal define an internal space; a first electrode coupled to the first cell terminal, a second electrode coupled to the second cell terminal, and a reversible switch disposed inside the internal space and electrically isolated from the electrodes, the switch having electrical contacts that react in a predetermined manner to an internal cell pressure level that has increased to a predetermined threshold; and
(b) a charger electrically connected to the cell terminals via charging leads to supply a charge thereto, the charger including a sensing circuit connected to the switch to detect the predetermined reaction of the switch and adjust the charge being sent to the terminals.

12. The charging assembly as recited in claim 11, wherein the charger is connected to each electrical contact via a pair of sensing leads that are further connected to a sensing circuit.

13. The charging assembly as recited in claim 12, wherein the switch closes when the internal cell pressure level increases to the predetermined threshold.

14. The charging assembly as recited in claim 13, wherein the charger reduces or eliminates the charge being sent to the terminals when the sensing circuit determines that the switch has closed.

15. The charging assembly as recited in claims 11, wherein at least one of the contacts flexes towards the other contact in response to an increase in internal pressure.

16. The rechargeable electrochemical cell as recited in claim 11, wherein the switch is disposed between the electrodes and the second cell terminal.

17. The charging assembly as recited in claim 16, further comprising a plate extending radially from the crimped end, wherein the reversible switch is supported by the plate.

18. The charging assembly as recited in claims 17, wherein the plate extends from the gasket and is conductive and in communication with the second cell terminal and the second electrode.

19. A method for regulating the charging of an electrochemical cell of the type having a can that defines a first cell terminal and a crimped open end that is sealed by a gasket that carries a second cell terminal, a first electrode coupled to the first cell terminal, a second electrode coupled to the second cell terminal, and a reversible switch having electrical contacts disposed inside the can, the switch being electrically isolated form the electrodes, the method including the steps of:
(a) connecting the terminals to charging leads of an electrochemical cell charger;
(b) applying a charge to the cell via the charging leads;
(c) actuating the switch when an internal cell pressure exceeds a predetermined threshold;
(d) in response to step (c), reducing or eliminating the charge.

20. The method as recited in claim 19, further comprising connecting the switch to sensing leads of the electrochemical cell charger.

21. The method as recited in claim 20, further comprising (e) reversing the actuation of step (c) when the internal pressure falls below the predetermined threshold.

22. The method as recited in claim 21, further comprising repeating step (b) in response to step (e).

23. The method as recited in claim 19, wherein step (b) further comprises applying a constant current charge to the cell.

24. The method as recited in claim 19, further comprising the step of placing the switch between the electrodes and the second cell terminal.

25. The method as recited in claim 24, further comprising the step of supporting the switch with a plate extending radially from the crimped end.

26. The method as recited in claim 25, wherein the plate extends from the gasket and is conductive and in communication with at least one of the terminals.

* * * * *